United States Patent Office 3,804,924
Patented Apr. 16, 1974

3,804,924
METHOD OF PREVENTING BUILD-UP IN A POLYMERIZATION REACTOR
Stelvio Papetti and Ping L. Ku, Leominster, Mass., assignors to Foster Grant Co., Inc., Leominster, Mass.
No Drawing. Filed Nov. 24, 1971, Ser. No. 201,970
Int. Cl. C08f 1/11, 19/08
U.S. Cl. 260—880 R                    15 Claims

ABSTRACT OF THE DISCLOSURE

A method of preventing polymeric coating and build-up on the walls of a polymerization reactor during the graft copolymerization therein in an aqueous medium of an alkenyl aromatic monomer or a mixture of an alkenyl aromatic monomer and one or more other monomers such as nitrile and acrylic monomers onto a rubbery backbone in latex form is presented consisting of conducting the polymerization in the presence of a mixture of a polyalkylene oxide and another polymeric water-soluble organic compound in amounts sufficient to prevent the accumulation of polymer on the exposed surfaces of the reactor and the reactor accessories and to effect the stable suspension of the reaction mixture in the aqueous medium.

BACKGROUND OF THE INVENTION

This invention relates to the prevention of coating and build-up on the walls of a polymerization reactor and more particularly to the prevention of polymer coating and build-up on the walls of a reactor during the graft copolymerization therein in an aqueous medium of an alkenyl aromatic monomer or a mixture of an alkenyl aromatic monomer and a nitrile monomer onto a butadiene polymer in latex form.

The term "coating" is used to describe the accumulation of polymer on the walls of a reactor, particularly below the surface of the reaction medium during the polymerization of monomeric materials therein. The term "build-up" is used in the present discussion to describe the accumulation of polymer on the agitator shaft and on the wall of the reactor in the vicinity of the vapor-polymerization medium interface during the polymerization of monomeric materials therein. The term "alkenyl aromatic monomer" has its usual meaning and includes those polymerizable compounds containing an aromatic nucleus attached to an aliphatic hydrocarbon radical which contains a vinyl or substituted vinyl group. Typical members of this class are styrene, alpha-methylstyrene and vinyl toluene. The expression "nitrile monomer" is used in the present instance to define the group consisting of acrylonitrile and methacrylonitrile. The term "acrylic monomers" is used to designate monomers from which acrylic type polymers are made and this term includes the esters of acrylic and methacrylic acids.

Impact alkenyl aromatic polymers such as impact polystyrene and acrylonitrile-butadiene-styrene terpolymers, more commonly known as ABS polymers, have become very important items of commerce over the past few years because of their excellent physical properties. There are several methods for producing these polymers and the product of impact polymers depends, to a great extent, upon which method is used to produce them.

One method of polymerizing impact type alkenyl aromatic polymers consists in graft copolymerizing, in an aqueous medium, a monomer or mixture of monomers such as styrene and acrylonitrile and/or an acrylic monomer onto a rubbery polymer which is initially in latex form in the presence of a suspending agent and an oil-soluble catalyst or a combination of oil-soluble and water-soluble catalysts. U.S. Pat. No. 3,436,440, issued to Abe et al. on Apr. 1, 1969 discloses this type of polymerization process. U.S. Pat. No. 3,370,105, issued to De Bell et al., shows a process similar to that disclosed by Abe et al. except that the De Bell et al. process the rubbery latex is coagulated before any appreciable degree of polymerization occurs. A process also classified in this category is disclosed in copending U.S. patent application Ser. No. 168,422 filed on Aug. 2, 1971.

One difficulty has been encountered which presents a problem in the production of impact type polymers by this method. When polymerization processes are carried out in conventional polymerization reactors, such as in stainless steel reactors by this method, there is a tendency for polymer coating and build-up to occur on the wall of the reactor.

The thick ring of polymer customarily formed on the agitator shaft and reactor wall as a result of polymer build-up must be removed after the completion of each polymerization run. In the case of coating the deposition of polymer on the wall of the reactor is cumulative and the thickness becomes so great after several runs that the heat transfer coefficient drops to such a low point that it is not practical to run further polymerizations in the reactor. At this point, the reactor must be taken out of service so that the polymer coating can be removed from the reactor wall. The reactor is usually out of service for a few days resulting in the loss of production time. Furthermore, the reactor must usually be cleaned manually which is a difficult and time-consuming task. It is very important therefore that coating and build-up in reactors during the polymerization in an aqueous medium therein of an impact polymer type mixture be sharply reduced or completely eliminated. It is also desirable that this be accomplished while, at the same time, producing impact polymers having excellent physical properties. A method has now been discovered for eliminating or minimizing coating and build-up of polymeric material on the agitator shaft and wall of a reactor during the polymerization therein of impact type polymers in an aqueous medium in which the rubbery component is initially in the latex form. Accordingly, it is an object of the invention to present an improved impact polymer polymerization process. It is a second object to prevent the accumulation of polymeric coating and build-up on the agitator shaft and reactor wall during the production of impact type polymer in the reactor. It is a third object of the invention to present a process for making impact type polymers having excellent physical properties while at the same time preventing the accumulation of polymer on the portions of the polymerization equipment which are exposed to the polymerization mixture. These and other objects of the invention will become more readily apparent as the description proceeds.

SUMMARY OF THE INVENTION

According to the present invention polymeric coating and build-up on the agitator shaft and wall of a polymerization reactor during the polymerization in an aqueous medium therein of a rubbery polymer containing alkenyl aromatic monomer mixture is greatly reduced or eliminated by conducting the polymerization in the presence of a suspension system comprised of a mixture of a water-soluble polyalkylene oxide and a second polymeric water-soluble organic compound. The polyalkylene oxide, preferably containing two to three carbon atoms, per alkylene unit is used in the reaction mixture at a concentration up to about 0.4%, and the water-soluble organic compound is used in the range of about 0.05–2.0%, both percentages being based on the total weight of water present in the reactor.

DESCRIPTION OF THE INVENTION

The polymers prepared in accordance with the invention are those generally known as impact akenyl aromatic polymers. This includes polymers comprised of only an alkenyl aromatic component and a rubbery component, as well as polymers containing three or more components, such as those comprised of an alkenyl aromatic component, a nitrile component and a rubbery component.

The rubbery polymers used in the process of the invention may be any of those in latex form which are suitable for use in the preparation of impact alkenyl aromatic polymers. The rubber used in the invention is preferably a diene polymer and most preferably a butadiene latex, such as butadiene homopolymer or styrene-butadiene copolymer, commonly known as SBR.

The alkenyl aromatic monomer may be any of the polymerizable compounds containing an aromatic nucleus and having attached thereto an alkenyl group. The preferred alkenyl aromatic monomer is styrene. In a preferred embodiment of the invention the alkenyl aromatic monomer is copolymerized with other monomers containing vinyl-type unsaturation in the presence of the rubbery latex. Examples of suitable additional monomers are nitriles such as acrylonitrile and methacrylonitrile, and acrylates and methacrylates, such as methyl acrylate, ethyl acrylate and methyl methacrylate. In addition, other resinous polymers or resinous polymer producing monomers may be present in minor amounts provided that they do not interfere with the polymerization or undesirably affect the properties of the products of the invention. Since the invention is particularly suitable for the production of ABS type polymers it will be described in detail as it applies to the production of ABS type polymers.

The molecular weight of the polyalkylene oxide is not critical to the operation of the invention provided that it is water-soluble. In general, the molecular weight of water-soluble polyalkylene oxides vary over a very wide range such as, for example, up to about 8 million or more. It has been found that the most efficient and economic results are obtained using polyalkylene oxide having a molecular weight in the range of about 100,000 to about 8,000,000. In the preferred embodiment of the invention, the molecular weight range of the polyalkylene oxide varies from about 500,000 to about 5 million.

The polyalkylene oxides which are suitable for use in the invention are the water-soluble polyalkylene oxides, and preferably those containing two or three carbon atoms per alkylene unit. Polyalkylene oxides included in the preferred group are polyethylene oxide, polypropylene oxide, polyethylene oxide-polypropylene oxide copolymers and mixtures of these. The most preferred polyalkylene oxide is polyethylene oxide having a molecular weight of about 500,000 to 5 million.

Any amount of polyalkylene oxide up to about 0.4%, based on the weight of water, which will effectively and efficiently prevent the accumulation of polymer on the inside walls and other exposed parts of the reactor and accessories may be used in the process of the invention. The polyalkylene oxide is desirably used at very low concentrations, i.e., it is preferable to use no more polyalkylene oxide than is necessary to prevent the accumulation of polymer on the reactor parts and equipment. The amount necessary to accomplish this will vary with variations in the polymerization formulation, i.e., variations in the proportions and species of monomers, rubbery polymer and other components used in the polymerization formulation. In general, it has been found that very little or no polymer is deposited on the exposed parts of the polymerization equipment when the concentration of polyalkylene oxide is about 0.005 to 0.4%, based upon the weight of water in the reaction vessel. In the preferred embodiment of the invention about 0.007 to about 0.05% of alkylene oxide is incorporated into the polymerization formulation.

The second polymeric water-soluble organic compound used in the invention may be any of those ordinarily used as polymerization suspending agents. The molecular weight of suitable compounds is not critical as long as they are water-soluble and are effective in stabilizing the polymerization mixture in the aqueous medium. Typical suitable compounds are the partially hydrolyzed polyvinyl esters of monocarboxylic acids; polyglycols, gelatins, water-soluble alginates and solubilized cellulose derivatives. As specific examples of suitable water-soluble compounds the following may be mentioned: partially hydrolyzed polyvinyl acetate, commonly known as polyvinyl alcohol, partially hydrolyzed polyvinyl propionate, polyvinyl pyrrolidone polyacrylamide, hydroxyethyl cellulose, carboxymethyl cellulose etc. The preferred compound is polyvinyl alcohol. The term "polyvinyl alcohol" is used in its usual sense and designates not only pure polyvinyl alcohol but also products of partial hydrolysis of polyvinyl acetate which contain a sufficient number of free hydroxyl groups to render the material soluble in water. Particularly good results are obtained with about 88% hydrolyzed polyvinyl acetate, i.e., polyvinyl alchols in which about 12% of the acetate groups remain unhydrolyzed.

The amount of the second polymeric water-soluble organic compound may vary from about 0.05 to 2%, based on the weight of water present. Although the polyalkylene oxide may contribute to the stabilization of the suspension of the polymer in the aqueous medium, it is preferred that the second polymeric water-soluble organic compound be present in an amount sufficient to stabilize the polymeric suspension by itself, i.e., the second polymeric organic compound is the essential component for stabilizing the suspension of the polymerization mixture in the aqueous medium. When the second polymeric water-soluble organic compound is present in the polymerization formulation as the principal suspending agent, the resulting polymer has excellent physical properties. In the preferred embodiment of the invention the amount of the second polymeric water-soluble organic compound varies between about 0.1 and 1.0%, based on the total weight of water.

The polyalkylene oxide and the second polymeric water-soluble organic compound may be added either initially or at any time during the polymerization prior to the coagulation of the emulsion. They may be added simultaneously or at different times and they may be combined and added together or added separately. Additionally, they may be added in one or more increments during the polymerization.

In a typical procedure in accordance with a preferred embodiment of the invention, the rubbery latex, monomer or monomers, water, a suitable catalyst or catalysts, an antioxidant and the polyalkylene oxide and second polymeric organic compound are added to a reaction vessel. Agitation is commenced and the reaction mixture is heated to and maintained at a temperature within the range at which polymerization occurs. The polymerization is preferably initiated with the rubbery polymer in the latex state. During the course of the polymerization the latex coagulates and the system converts to a stable suspension and the polymerization continues to completion with the reaction mixture in stable suspension. The invention will now be further illustrated in the following specific examples in which parts and percentages are on a weight basis. The tensile strength at yield is determined according to the procedure of ASTM D638–68 and it is reported in p.s.i.

EXAMPLE I

A five liter resin flask equipped with a thermometer, a stainless steel agitator and a stainless baffle is charged with the following polymerization formulation.

| | Parts |
|---|---|
| Water | 3050 |
| Polybutadiene latex | 281 |
| Styrene | 571 |
| Acrylonitrile | 234 |
| Polyvinyl alcohol | 12.8 |
| Polyethylene oxide [1] | 0.2 |
| Oil-soluble peroxide catalyst | 2.5 |
| t-Dodecyl mercaptan | 2.7 |
| Antioxidant | 4.8 |

[1] This compound has a molecular weight of about 600,000.

Agitation in the reaction vessel is commenced and the stainless steel baffle is adjusted so that the bottom half extends beneath the surface of the reaction mixture. The reaction mixture is heated to about 80° C. and maintained at that temperature for about five hours, at which point the polymerization is substantially complete. The polymerization reaction proceeds with the rubber in the latex state for about one hour and forty-five minutes. The latex then coagulates and the system converts to a stable suspension and remains in this state until the polymerization is complete. The stability of the suspension is excellent during the suspension polymerization stage. The contents are removed from the reaction vessel and the agitator and baffle are examined and found to be free from polymer. The tensile stress at yield was measured for test bars molded from the reaction product and found to be 5000 p.s.i.

EXAMPLE II

The procedure of Example I is repeated using the following formulation:

| | Parts |
|---|---|
| Water | 3400 |
| Polybutadiene latex | 281 |
| Styrene | 546 |
| Acrylonitrile | 234 |
| Polyethylene oxide (M. W. 600,000) | 0.4 |
| Hydroxypropyl methyl cellulose | 17.5 |
| Oil-soluble peroxide catalyst | 2.5 |
| t-Dodecyl mercaptan | 2.7 |
| Antioxidant | 4.8 |

The stability of the suspension is good during the suspension stage of the polymerization. At the conclusion of the polymerization the stainless steel baffle and agitator are examined and found to have only a very slight coating of polymer.

EXAMPLE III

The procedure of Example I is repeated using the following formulation:

| | Parts |
|---|---|
| Water | 3400 |
| Polybutadiene latex | 281 |
| Styrene | 546 |
| Acrylonitrile | 234 |
| Polyethylene oxide (M. W. 600,000) | 0.4 |
| Polyvinyl pyrrolidone | 13.0 |
| Oil-soluble peroxide catalyst | 2.5 |
| t-Dodecyl mercaptan | 2.7 |
| Antioxidant | 2.8 |

The stability of the polymerization remained good during the suspension stage of the polymerization. The stainless steel agitator and baffle are examined at the conclusion of the polymerization and found to be only very slightly coated with polymer.

COMPARATIVE EXAMPLE A

The procedure of Example I is repeated except that the suspending system consists of 0.34%, based on the weight of water present, of polyvinyl alcohol. The stability of the suspension is good during the suspension stage of the polymerization. At the conclusion of the polymerization, the agitator and baffle are examined and found to be heavily coated with polymer.

COMPARATIVE EXAMPLE B

Example I is repeated except that the suspending system consists of 0.2%, based on the weight of water present, of polyethylene oxide (M. W. 600,000). The stability of the suspension is good during the suspension stage of the polymerization. At the conclusion of the polymerization the baffle and agitator are examined and found to be free of polymer. The tensile stress at yield, measured for tensile specimens molded from the reaction product is 3400 p.s.i.

Examples I to III illustrate preferred embodiments of the invention. These examples show that suspension systems comprised of a combination of a polyalkylene oxide and another polymeric water-soluble organic compound are very effective in stabilizing impact alkenyl aromatic polymerization suspensions in which the rubbery component is initially present as a latex. Furthermore, these examples demonstrate that very little or no polymer accumulates on the exposed parts of a reactor in which such a polymerization is carried out.

Comparative Example A shows that when polyvinyl alcohol is used alone in a process otherwise identical to the process of Example I, heavy build-up and coating of polymer occurs on the polymerization reactor wall and accessories in spite of the fact that a stable suspension is maintained throughout the suspension stage of the polymerization. Comparative Example B illustrates that products made according to a process which is similar to the process of Example I except that polyethylene oxide is used as the sole suspending agent have a much lower tensile stress than products made by the process of Example I.

Although the invention has been described with particular reference to specific examples, it is understood that the scope of the invention is not limited thereto, and that variations not inconsistent with the disclosure are contemplated. For example, it is contemplated that polyalkylene oxides other than polyethylene oxide may be used in the invention. The scope of the invention is limited only by the breadth of the appended claims.

I claim:

1. In a process for making alkenyl aromatic impact polymers by graft copolymerizing an alkenyl aromatic monomer and a nitrile monomer which is acrylonitrile or methacrylonitrile onto a rubbery polymer which is polybutadiene or butadiene-styrene copolymer and which is in latex form, said copolymerization being conducted in an aqueous medium, in the presence of a polymerization catalyst and in the presence of a suspension system; the improvement consisting essentially of employing a suspension system consisting essentially of a water-soluble polyalkylene oxide which is polyethylene oxide, polypropylene oxide, polyethylene oxide-polypropylene oxide copolymers or mixtures of these and a second polymeric, water-soluble, organic polymerization suspending agent which is partially hydrolyzed polyvinyl acetate, partially hydrolyzed polyvinyl propionate, polyvinyl pyrrolidone, polyacrylamide, hydroxyethyl cellulose, carboxymethyl cellulose or mixtures of these, said polyalkylene oxide being employed in an amount sufficient to prevent the accumulation of polymer build-up on the walls of a polymerization reactor and said second suspending agent being employed in an amount such that the total amount of suspension system is sufficient to stabilize a suspension of the copolymerization medium.

2. The process of claim 1 wherein a nitrile monomer which is acrylonitrile or methacrylonitrile is copolymerized along with the alkenyl aromatic polymer and wherein said alkenyl aromatic polymer is styrene.

3. The process of claim 2 wherein said polyalkylene oxide is selected from the group consisting of polyethylene oxide, polypropylene oxide, polyethylene oxide-polypropylene oxide copolymers and mixtures of these and it is present in an amount of about 0.005 to about 0.4 part per 100 parts of water and said second polymeric water-soluble organic suspending agent is selected from the group consisting of partially hydrolyzed polyvinyl esters of monocarboxylic acids, polyglycols, solubilized cellulose derivatives, gelatins, water-soluble alginates and mixtures of these and it is present in an amount of about 0.05 to 2.0 parts per 100 parts of water.

4. The process of claim 3 wherein an acrylic monomer is present in the polymerization formulation.

5. The process of claim 3 wherein the second organic suspending agent is polyvinyl alcohol which is present in an amount of about 0.1 to 1.0 part per 100 parts of water and wherein the polyalkylene oxide is polyethylene oxide which is present in an amount of about 0.007 to 0.05 part per 100 parts of water.

6. A method for preventing the accumulation of polymer on the walls of a polymerization reactor during the graft copolymerization therein of an alkenyl aromatic monomer and a nitrile monomer which is acrylonitrile or methacrylonitrile onto a rubbery butadiene polymer in latex form, said copolymerization being conducted in an aqueous medium and in the presence of a polymerization catalyst; said method consisting essentially of conducting the polymerization in the presence of (1) a water-soluble polyalkylene oxide which is a member of the group consisting of polyethylene oxide, polypropylene oxide, polyethylene oxide-polypropylene oxide copolymers and mixtures of these and which is present in an amount of about 0.005 to about 0.4%, by weight based on total weight of water present in reactor and (2) a second water-soluble organic polymerization suspending agent which is selected from the group consisting of partially hydrolyzed polyvinyl esters of monocarboxylic acids, polyglycols, solubilized cellulose derivatives, gelatins, water-soluble alginates and mixtures of these and which is present in an amount of about 0.05 to 2.0% by weight based on the total weight of water present in the reactor.

7. The method of claim 6 wherein said reaction mixture contains, as the essential catalytic agent, an oil-soluble catalyst.

8. The method of claim 6 wherein a nitrile monomer which is acrylonitrile or methacrylonitrile is present in the polymerization mixture and wherein the alkenyl aromatic monomer is styrene.

9. The method of claim 8 wherein the polyalkylene oxide is polyethylene oxide which is present in an amount of about 0.007–0.05%, based on the total weight of water in the reaction mixture and wherein the second organic suspending agent is polyvinyl alcohol which is present in an amount of about 0.1 to 1.0% by weight based on the total weight of water.

10. The method of claim 8 wherein an acrylic monomer is present in the polymerization mixture.

11. In a process for making ABS polymers by graft copolymerizing styrene and acrylonitrile onto a rubbery butadiene polymer in latex form, said copolymerization being conducted in an aqueous medium, in the presence of a polymerization catalyst and in the presence of a suspension system; wherein the improvement consists essentially of conducting the copolymerization in the presence of a suspension system of about 0.005 to about 0.4% of a water-soluble polyalkylene oxide, having a molecular weight of about 100,000 to about 8,000,000, which is polyethylene oxide, polypropylene oxide, polyethylene oxide-polypropylene oxide copolymer or mixtures of these and 0.05 to 2.0% of a second polymeric water-soluble organic compound selected from the group consisting of partially hydrolyzed polyvinyl acetate, partially hydrolyzed polyvinyl propionate, polyvinyl pyrrolidone, polyacrylamide, hydroxyethyl cellulose, carboxymethyl cellulose and mixtures of these.

12. The process of claim 11 wherein the polyalkylene oxide is polyethylene oxide and the second polymeric compound is polyvinyl alcohol.

13. The process of claim 12 wherein said polyvinyl alcohol is about 88% hydrolyzed polyvinyl acetate.

14. The process of claim 12 wherein the essential catalytic agent is an organic peroxide catalyst.

15. The process of claim 12 wherein said polymerization is carried out in the presence of a catalytic system comprised of a water-soluble catalyst and an oil-soluble catalyst.

References Cited

UNITED STATES PATENTS

| 3,370,105 | 2/1968 | De Bell et al. | 260—880 |
| 3,436,440 | 4/1969 | Abe et al. | 260—880 |
| 3,660,325 | 5/1972 | Bremmer et al. | 260—880 |
| 3,663,655 | 5/1972 | Sturt | 260—880 |

FOREIGN PATENTS

| 873,948 | 8/1961 | Great Britain | 260—880 |
| 892,910 | 4/1962 | Great Britain | 260—880 |

JAMES A. SEIDLECK, Primary Examiner

U.S. Cl. X.R.

260—85.5 HC, 93.5 W